United States Patent Office 3,352,940
Patented Nov. 14, 1967

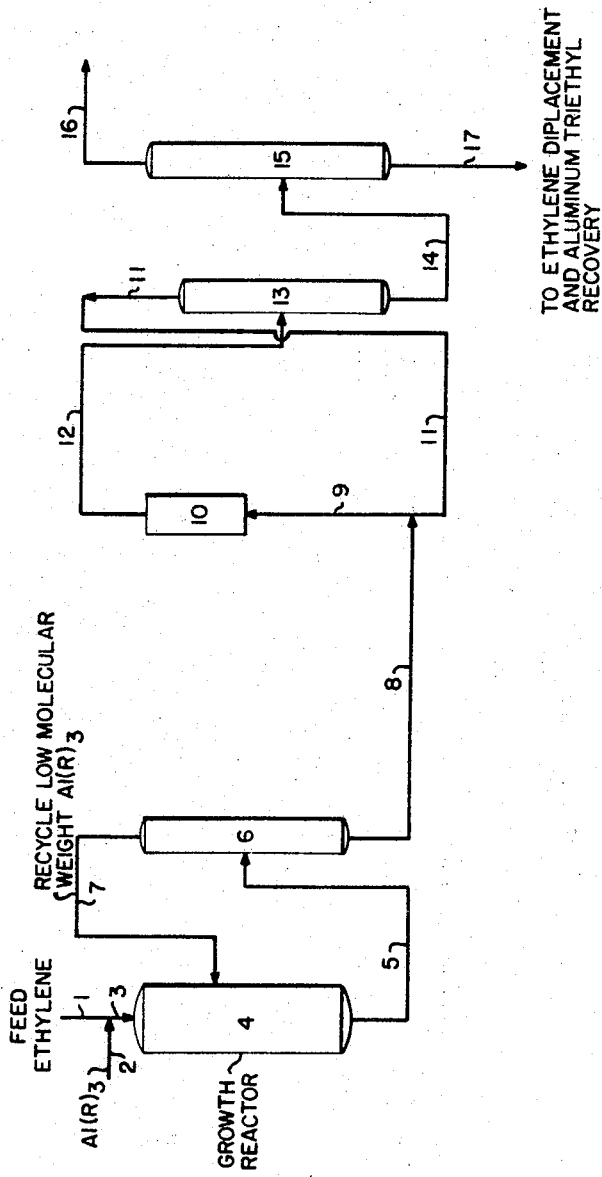

3,352,940
PROCESS FOR PRODUCTION OF N-α-OLEFINS
BY THE ALKYL METAL TECHNIQUE
Ronald Vander Linden and Joseph Serratore, Sarnia, Ontario, Canada, assignors to Esso Research and Engineering Company, a corporation of Delaware
Filed Feb. 11, 1963, Ser. No. 257,729
5 Claims. (Cl. 260—683.15)

This invention relates to the preparation of normal alpha olefins. More particularly, this invention pertains to a novel process for the synthesis of a full range of straight chain alpha olefins by a process which involves the growth of a low molecular weight alkene onto a low molecular weight aluminum alkyl so as to a produce a range of aluminum alkyls having a narrowed Poisson distribution of the desired $C_{12}$–$C_{20}$ alkyl chain lengths and subsequently the olefins produced therefrom.

It is known in the prior art to prepare a full range of $C_6$ through $C_{20}$ normal olefins by a process comprising the steps of: (1) adding or growing ethylene onto low molecular weight, i.e. $C_2$–$C_6$, aluminum trialkyls to produce higher molecular weight aluminum trialkyls, (2) reacting said growth higher aluminum trialkyls with low molecular weight olefins to obtain a displacement of the higher molecular weight alkyl groups by said lower olefins thus forming higher olefins and lower molecular weight aluminum trialkyls corresponding to the displacing olefins, and (3) separating the displaced higher molecular weight olefins as product from the lower molecular weight aluminum alkyls formed in the displacement reaction, which lower alkyls are recycled to the process.

To further illustrate the above general type of reaction with which this invention is concerned, reference may be had to the following equations, with (1) representing the reaction of aluminum triethyl with ethylene to form higher molecular weight aluminum alkyls having a molecular weight distribution such as described in Table I. Reaction (2) sets forth a displacement reaction wherein a lower molecular weight olefin, such as n-butylene, is reacted with the aluminum alkyl growth product at moderately elevated temperatures and, if desired, in the presence of a catalyst to cause displacement of the alkyl side chains by the butylene, thus generating normal olefins corresponding to the alkyl chains displaced.

(1) $Al(C_2H_5)_3 + 3X(C_2H_4) \rightarrow Al[(C_2H_4)_x(C_2H_5)]_3$
(2) $Al[(C_2H_4)_x(C_2H_5)]_3 + 3(C_4H_8)$
$\rightarrow Al(C_4H_9)_3 + 3[(C_2H_4)_x(C_2H_5)]$ However, the prior art processess employing the above general type of reaction have been limited to the production of a mixture of olefins in which there is a predominance of the $C_6$–$C_{10}$ and lower olefins, since the mixture obtained has a Poisson distribution of the various carbon numbers. For example, the preparation of n-α-olefins via the above-mentioned AM (alkyl metal) technique will yield a random distribution of n-α-olefins following the Poisson equation:

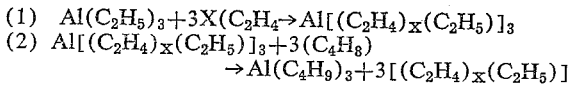

$$X_{(p)} = \frac{nPe^{-n}}{p}$$

where $n$ is the average ethylene absorbed by the starting alkyl and $p$ is the number of ethylene units in a given homologue. Thus, when ethylene is reacted with or grown onto aluminum triethyl under elevated temperatures and pressures, the resultant product contains a mixture of aluminum trialkyls wherein the alkyl chains contain a range of from 4 to 24 carbon atoms, but mainly 4 to 16 carbon atoms and especially 6 to 10 carbon atoms. A typical product from such a reaction comprises the following distribution:

TABLE I

| Components | Composition of "growth" alkyl product in mole percent |
|---|---|
| $Al(C_2H_5)_3$ | 1.72 |
| $Al(C_4H_9)_3$ | 15.45 |
| $Al(C_6H_{13})_3$ | 23.18 |
| $Al(C_8H_{17})_3$ | 23.18 |
| $Al(C_{10}H_{21})_3$ | 17.38 |
| $Al(C_{12}H_{25})_3$ | 10.43 |
| $Al(C_{14}H_{29})_3$ | 5.21 |
| $Al(C_{16}H_{33})_3$ | 2.23 |
| $Al(C_{18}H_{37})_3$ | 0.84 |
| $Al(C_{20}H_{41})_3$ | 0.28 |
| $Al(C_{22}H_{45})_3$ | 0.02 |

The above alkyls will generally be present in aluminum compounds of heterogeneous composition; that is, a single aluminum trialkyl molecule may and usually does contain alkyl groups of different chain lengths. In any even, it will be noted that an inherent disadvantage is that the growth product normally comprises substantially lower amounts of $C_{12}$–$C_{20}$ and higher alkyl radicals than the $C_6$–$C_{10}$ and lower alkyl radicals. The olefins obtained from the $C_{12}$–$C_{20}$ or higher alkyl aluminum compounds are extremely valuable since they are useful as intermediates for various reactions including the synthesis of detergent alkylate, alcohols, acids and the like. These intermediates are particularly desirable since the end products will be of the straight chain variety. Thus, for example the $C_{12}$–$C_{20}$ or higher olefins are an excellent feed stock for detergent alkylate manufacture.

Another disadvantage of the prior art process is that such processes have also been limited generally to the production of $C_8$–$C_{10}$ olefins because no practical methods were known for completely separating olefins boiling higher than about $C_{10}$ or at most $C_{12}$ olefins from the aluminum alkyls remaining after the displacement reaction inasmuch as the higher boiling $C_{12}$ and higher olefins could not be distilled overhead from the liquid aluminum alkyls due to the relatively low decomposition temperatures of said aluminum alkyls and/or the closely similar boiling ranges of the lower aluminum alkyls and these higher olefins. Thus, according to the prior art processes, it was usually necessary to closely regulate the growth conditions so as to obtain a minimum rather than a maximum amount of $C_{12}$ and higher olefins. Additionally, those higher olefins which were formed required removal by purging, which involved the loss of an important amount of commingled, valuable aluminum alkyls. Further, in order to keep these aluminum alkyl purge losses to a minimum, it was necessary in the prior art process to allow the $C_{12}$ and higher olefin content of the recycle aluminum alkyl stream to build up to fairly high levels, which also deleteriously affected the process due to the cost of circulating large amounts of this material.

Further, while olefins, e.g., $C_{12}$ and higher olefins, which may be recycled to the growth reactor with the recycle aluminum alkyl stream do react to some extent with growth product to ultimately form higher olefins, such resulting olefins are highly branched in structure. This branching effect is shown in the following Table II which shows the branched olefin content without use of olefin recycle to the growth reactor as compared with the recycle of higher olefins with recycle aluminum triethyl:

TABLE II

| Olefin | Percent Branched Olefins | |
|---|---|---|
| | With Recycle | Without Recycle |
| $C_{18}$ | 16 | 5 |
| $C_{20}$ | 20 | 8 |
| $C_{22}$ | 25 | 10 |

It is, therefore, an object of this invention to provide an improved method for the selective production of highly valuable $C_{12}$–$C_{20}$ and higher olefins from aluminum alkyls and ethylene.

It is a further object of this invention to provide an improved continuous cyclic method for the selective production of substantially unbranched $C_{12}$–$C_{20}$ and higher olefins from aluminum alkyls and ethylene.

It is a further object of this invention to narrow the Poisson distribution and thereby produce in a continuous manner, by the growth process, an aluminum alkyl product having a predominance of $C_{12}$–$C_{20}$ and higher alkyl radicals.

It should be here noted, with reference to the description of the aluminum trialkyls throughout the specification and claims, that the number of carbon atoms described (e.g. $C_4$) refers to the number in each alkyl group.

According to the present invention, it has now been discovered that preparation of predominantly straight chain $C_{12}$–$C_{20}$ olefins can be effected by a process for the preparation of said olefins which comprises continuously feeding $C_2$–$C_3$ olefins, preferably ethylene, and a lower molecular weight aluminum trialkyl into a growth reaction zone at elevated temperatures and pressures, reacting in said zone said $C_2$–$C_3$ olefins and lower molecular weight aluminum trialkyl, and recovering from said zone an aluminum trialkyl growth product. The improvement of the present invention comprises separating said growth product into a lower molecular weight aluminum trialkyl fraction and a higher molecular weight aluminum trialkyl fraction, subjecting said lower molecular weight aluminum trialkyl fraction to further growth in a growth reaction zone and passing said higher molecular weight aluminum trialkyl fraction to a displacement zone.

The present invention will be more clearly understood from a consideration of the accompanying drawing, which presents a preferred processing scheme for carrying out the present invention. Turning now to the drawing, a $C_2$–$C_3$ olefin feed, in this instance, an ethylene stream containing small amounts of ethane (e.g. up to about 2 mol percent) is passed from line 1 and line 3 to growth reactor 4. Lower molecular weight aluminum trialkyl is supplied from line 2 and line 3 to growth reactor 4. Suitable aluminum trialkyls, that is compounds having the formula:

wherein $R_1$, $R_2$, and $R_3$ may represent similar or different alkyls, include compounds wherein the alkyl group contains from 2 to 8 carbon atoms. Thus aluminum triethyl, aluminum tripropyl, aluminum tributyl, aluminum tripentyl are suitable for use in the instant invention. Aluminum triethyl is especially preferred. In the growth reactor 4 under appropriate reaction conditions ethylene is grown onto the aluminum trialkyls until the trialkyls contain an increased number of carbon atoms, for example, from 4 to 20 and higher. Growth conditions in the processes of this invention may be as follows:

Temperature, 160–350, preferably 200–300, specifically 210° F.

Pressure, 500–5000 p.s.i.a., preferably 1000–3000, specifically 1600 p.s.i.a.

Reaction times, 0.2–10 hours, preferably 0.6–5 hours, specifically 2 hours.

Mols of ethylene per mol of starting aluminum alkyl, 0.5–20, preferably 2–14, specifically 5.

Following the growth stage, the effluent is passed from reactor 4 through line 5 to separator 6. Here, in accordance with the instant invention, lower molecular weight aluminum trialkyls are separated overhead and are recycled to the process through line 7. The lower molecular weight aluminum trialkyl fraction separated comprises a mixture containing a predominance of $C_2$, $C_4$, $C_6$ and $C_8$ alkyl groups. Some alkyl groups with more carbon atoms will also be present in the separated fraction, although usually in small to negligible amounts. For example, the distillation of the "Growth" alkyl illustrated in Table I would result in the distillate composition set forth in the following Table III. In addition to such distillate composition, Table III also illustrates the percent of each "Growth" alkyl component of Table I distilled overhead.

TABLE III.—DISTILLATION OF "GROWTH" ALKYL OF TABLE I

| Components | Distillate Composition in Mole percent of Total Feed | Percent of Each Component in Overhead |
|---|---|---|
| $Al(C_2H_5)_3$ | (1) | 1.72 |
| $Al(C_4H_9)_3$ | 78.8 | 12.2 |
| $Al(C_6H_{13})_3$ | 75.8 | 17.6 |
| $Al(C_8H_{17})_3$ | 60.2 | 13.9 |
| $Al(C_{10}H_{21})_3$ | 35.8 | 6.2 |
| $Al(C_{12}H_{25})_3$ | 19.2 | 2.0 |
| $Al(C_{14}H_{29})_3$ | 10.6 | 0.55 |
| $Al(C_{16}H_{33})_3$ | 5.0 | 0.11 |
| Total | | 54.28 |

1 About 100.

A preferred method of separating the lower molecular weight aluminum trialkyl fractions is by distillation of the growth alkyl product using a short residence time evaporator or by a molecular distillation technique. Operating conditions may be as follows:

Temperature, 100–600, preferably 370°–500° F., specifically 480° F.

Pressure, $10^{-6}$–10 mm., preferably $10^{-4}$–1 mm., specifically 0.1 mm.

Residence time, 0.01–10 seconds, preferably .1–2 sec., specifically 1 second.

It should be noted that it is considered within the scope of the present invention to carry out the subsequent growth of the distillate from the above-mentioned distillation in a reactor other than the primary growth reactor referred to above. Thus, the distillate may be passed directly to a second and different growth reactor rather than be recycled to the primary growth reactor.

The overhead product is recycled to the reactor for further buildup, thus increasing the ultimate yield of desired $C_{12}$–$C_{20}$ olefins based on ethylene consumed and narrowing the Poisson distribution of the final equilibrium product.

The higher molecular weight aluminum trialkyls comprising a predominance of $C_{10}$ and higher, for example up to $C_{24}$, aluminum trialkyls are taken as bottoms from separator 6 through line 8 to displacement with a higher molecular weight alpha olefin to yield the $C_{10}$–$C_{24}$ n. alpha olefin and the corresponding higher aluminum trialkyl. If desired, the liquid phase from separator 6 is passed through line 8 to a further separator (not shown) where at reduced pressure, a purge stream containing ethane is passed from the process. The degassed liquid aluminum alkyls are then passed through line 9 to displacement reactor 10 wherein the growth stage aluminum alkyl product is contacted with higher alpha olefin supplied through line 11. This displacement and the other displacement reactions of this invention may be conducted in the presence of a suitable catalyst such as a nickel or cobalt, preferably nickel catalyst, or without a catalyst. Suitable catalysts are liquid materials such as nickel acetyl acetonate, or colloidal nickel, solid materials such as Raney nickel, and supported materials such as nickel sulfide or alumina. The type of catalyst used generally is not important, however, it is preferred to utilize a catalyst in liquid phase operations and not to use one in vapor phase operations. In liquid phase operations using nickel acetyl acetonate or colloidal nickel as the catalyst the amount of catalyst used may be for example 0.2–0.5 mole percent based on alkyls, specifically, 0.3 mole percent. These equilibrium displacement reactions should be carried out at conditions which minimize double bond migration and skeletal isomerization of the product olefins. Temperature, and to a lesser degree, time, are most important in this respect. At the same time yield considerations necessitate practical minimums for these variables. Of course, the law of mass action can be effectively employed by utilizing a large excess of displacing olefin or by running the displacement reaction in vapor phase with respect to the displacing olefin thereby to cause said olefin to substantially remove the olefins displaced as formed. The conditions in the displacement reactors, which may be run in either liquid or gas phase with respect to the displaced olefins, may vary to considerable extent, being determined for any particular embodiment by the characteristics of the reactants and the equipment available. However, generally at least 3 moles of displacing olefins per mole of $C_8$ and higher aluminum alkyls are utilized with preferably 10 to 100 or more moles/mole, and specifically 50 moles being employed.

The product from the displacement step is passed from the reactor through line 12 to recycle olefin tower 13. In said tower unreacted excess alpha olefin is separated overhead under a vacuum sufficient to prevent a thermal decomposition of the aluminum alkyl containing bottoms at the distillation temperature. Thus, tower 13 is operated at preferably 5 mm. to 760 mm. Hg overhead pressure and a temperature of from 70 to 275° F. The alpha olefin stream is passed overhead through line 11 and recycled through said line 11 to the displacement reactor 10.

From the bottom of tower 13 the displaced product olefins and higher aluminum trialkyls are passed through line 14 to tower 15. Here $C_8$ to $C_{16}$ olefins are separated overhead through line 16. Tower 15 is operated at an overhead pressure sufficiently reduced, i.e. preferably around .01 to 10 mm. Hg, to limit or prevent thermal decomposition of the aluminum trialkyl containing bottoms, which trialkyls decompose at about 230 to 270° F. Thus, an efficient separation is obtained of a substantial part of the $C_{16}$ olefin (boiling at 260° F.) at 5 mm. Hg and all of the $C_{14}$ and lighter material (boiling at 220° F.) from the higher aluminum trialkyl plus $C_{18}$ and higher olefin bottoms.

From the bottom of tower 15 the higher aluminum trialkyl along with the higher boiling olefins are passed through line 17. At least part of the stream is passed to a secondary displacement reactor. Here ethylene is supplied with the result that the higher alkyl chains are displaced with ethylene thus forming aluminum triethyl and higher alpha olefins. The aluminum triethyl is recycled to the growth reactor and the relatively pure olefins are passed to conventional purification or may be used as such.

It is, of course, also contemplated according to this invention that alternatively the initial displacement reaction may be run using a different displacing olefin to obtain the corresponding aluminum trialkyl or employ any other conventional modification to effect the desired displacement.

It should be noted here that the necessity for a purge stream is entirely eliminated in the present invention process. This is extremely important in that, although in the prior art processes the olefins mixed with the aluminum alkyls in the purge stream can be recovered by hydrolysis, the much more valuable aluminum trialkyls were destroyed in the hydrolysis. It should be noted that in both the prior art processes and the present invention process the valuable aluminum alkyls for the most part (except for any purge or other losses) are not consumed but rather are merely continuously recycled in the process. Thus, by the present invention, for the first time essentially complete recovery and recycle of aluminum alkyls is obtained thus greatly reducing the total cost of the product olefins produced. This is true regardless of whether $C_{12}$–$C_{20}$ or higher range of olefins is desired or whether, as in prior art processes, production of $C_8$–$C_{10}$ olefins is preferred. In any event, growth conditions may now be controlled to obtain exactly the product distribution desired rather than unnecessarily recycling higher aluminum alkyls as was formerly required.

In summary, it should be noted that according to the process of the present invention:

(1) Higher, $C_{10+}$ olefins can now be produced in predominance due to narrowed Poisson distribution.
(2) Purging of valuable trialkyls is eliminated.
(3) Growth step limitations are removed so that the growth step can be operated to give the desired $C_{10}$–$C_{20}$ product distribution at the economic optimum.

To set forth a specific operative embodiment of this process, the following examples are submitted showing specific and general conditions which enable one skilled in the art to operate a process such as described above and claimed hereinafter.

*Example 1*

This example illustrates the conditions employed in the distillation of the "growth" alkyl product from a growth reactor as hereinbefore described and, in addition, illustrates the distribution of the components of the "growth" product before distillation as well as the distribution in the distillate and bottoms recovered after distillation.

Three distillation experiments, using a $C_{8.5}$ average "growth" alkyl product as feed, were carried out at various feed rates using an Asco "50.2" Rotafilm molecular still. The molecular stills in each of the runs, referred to as Run A, Run B and Run C were operated under the following conditions:

| | Conditions | | |
|---|---|---|---|
| | Run A | Run B | Run C |
| Feed (grams) | 153.8 | 120.7 | 180.8 |
| Temperature (° F.) | 475 | 483 | 483 |
| Pressure (mm. of Hg) | 0.4 | 0.4 | 0.4 |
| Feed Rate (g./min.) | 9.04 | 5.24 | 6.03 |
| Time (minutes) | 17 | 23 | 30 |
| Workup Method | (1) | (1) | (1) |

[1] Hydrolysis.

The composition of the "growth" product fed to the molecular still and the composition of the resulting products are given in weight percent:

of an $AlR_3$ with $C_4$ average R groups and the blended composition is grown by two average ethylene units as compared to one in Example 2.

| Composition | "Growth" Product Feed to Still | Run A, Recovery in— | | Run B, Recovery in— | | Run C, Recovery in— | |
|---|---|---|---|---|---|---|---|
| | | Overhead | Bottoms | Overhead | Bottoms | Overhead | Bottoms |
| $Al(C_2H_5)_3$ | 2.48 | 2.21 | ------ | 2.22 | ------ | 2.44 | ------ |
| $Al(C_4H_9)_3$ | 7.83 | 6.45 | 0.56 | 6.16 | 0.07 | 6.31 | 0.45 |
| $Al(C_6H_{13})_3$ | 9.24 | 5.21 | 3.29 | 7.00 | 0.99 | 6.46 | 0.39 |
| $Al(C_8H_{17})_3$ | 12.9 | 4.89 | 8.10 | 7.76 | 4.81 | 6.43 | 6.90 |
| $Al(C_{10}H_{21})_3$ | 14.2 | 3.04 | 11.21 | 5.08 | 8.77 | 3.94 | 10.46 |
| $Al(C_{12}H_{25})_3$ | 14.1 | 1.83 | 11.39 | 2.71 | 10.3 | 2.07 | 11.10 |
| $Al(C_{14}H_{29})_3$ | 11.7 | 1.10 | 9.56 | 1.24 | 9.12 | 1.16 | 9.62 |
| $Al(C_{16}H_{33})_3$ | 8.54 | 0.84 | 7.06 | 0.71 | 6.78 | 0.84 | 6.96 |
| $Al(C_{18}H_{37})_3$ | 5.18 | 0.58 | 4.41 | 0.62 | 4.25 | 0.68 | 4.37 |
| $Al(C_{20}H_{41})_3$ | 2.89 | 0.34 | 2.54 | 0.31 | 2.58 | 0.41 | 2.58 |
| $Al(C_{22}H_{45})_3$ | 1.14 | 9.06 | 1.33 | 0.16 | 1.04 | 0.07 | 1.17 |

*Examples 2 and 3*

The following two examples illustrate that higher yields of the desired n-α-olefins can be produced by the use of distilled growth alkyls in accordance with the practice of the present invention. Example 2 illustrates the use of a "growth" trialkyl product with a $C_8$ average chain length similar to that hereinbefore illustrated in Table I. The procedure employed is outlined in the following Table IV. An aluminum trialkyl ($AlR_3$) containing $C_8$ average R groups was taken as feed to distillation. The percent of each component recovered in the overhead fraction from the feed is set forth in the table. This distillate is recycled to a point referred to as "X" in the "growth" reactor which at that point contains a composition of an $AlR_3$ with $C_6$ average R groups. This blended composition is grown to an average of one ethylene unit. The distillation, recycle and growth is repeated until equilibrium conditions are reached. From calculations, it is determined that three such recycles to point X is sufficient to reach equilibrium composition.

Example 3 is similar to Example 2 except that the recycle stream is fed to a point referred to as Y in the growth reactor which at that point contains a composition The composition of the distillation feed and products at equilibrium conditions for both Examples 2 and 3 are tabulated in Table V. The extent of narrowing the Poisson distribution to a higher yield of $C_{12}-C_{20}$ n-α-olefins is outlined in the following summarized table:

| Olefin Fraction, Mole Percent | Initial $AlR_3$ Product, $R = C_8$ Avg. Alkyl | Example 2 | Example 3 |
|---|---|---|---|
| $C_2-C_{10}$ | 80.91 | 61.85 | 50.00 |
| $C_{12}-C_{20}$ | 18.99 | 37.96 | 49.14 |
| $C_{22+}$ | 0.03 | 0.19 | 0.86 |

Thus, the original Poisson distribution for a $C_8$ average aluminum trialkyl has been altered in the $C_{12}-C_{20}$ range from 18.99 to 49.14 mole percent when comparing it to Example 3. This increase of 30.05 mole percent can be utilized in a process where only small amounts of $C_{22+}$ material can be tolerated while maintaining a high yield of $C_2-C_{20}$ n-α-olefins.

TABLE IV.—RECYCLE OF LOWER MOLECULAR WEIGHT ALUMINUM TRIALKYLS BACK TO THE "GROWTH" REACTOR

| Components | Composition of "Growth" Alkyl Feed, in Mole Percent | Distillation of "Growth" Alkyl | | Recycle at Point x in "Growth" Reactor, Mole Percent | |
|---|---|---|---|---|---|
| | | Percent of Each Component in Overhead | Distillate Composition in Mole Percent of Total Feed | Composition at Point x [1] | Addition of 1st Distillate Recycle to Point x |
| $Al(C_2H_5)_3$ | 1.72 | 100 | 1.72 | 7.27 | 5.76 |
| $Al(C_4H_9)_3$ | 15.45 | 78.8 | 12.2 | 29.03 | 26.6 |
| $Al(C_6H_{13})_3$ | 23.18 | 75.8 | 17.6 | 29.03 | 30.3 |
| $Al(C_8H_{17})_3$ | 23.18 | 60.2 | 13.9 | 19.36 | 21.6 |
| $Al(C_{10}H_{21})_3$ | 17.38 | 35.8 | 6.2 | 9.67 | 10.3 |
| $Al(C_{12}H_{25})_3$ | 10.43 | 19.2 | 2.0 | 3.87 | 3.81 |
| $Al(C_{14}H_{29})_3$ | 5.21 | 10.6 | 0.55 | 1.29 | 1.19 |
| $Al(C_{16}H_{33})_3$ | 2.23 | 5.0 | 0.11 | 0.36 | 0.30 |
| $Al(C_{18}H_{37})_3$ | 0.84 | | | 0.10 | 0.06 |
| $Al(C_{20}H_{41})_3$ | 0.28 | | | 0.02 | 0.01 |
| $Al(C_{22}H_{45})_3$ | 0.02 | | | | |
| $Al(C_{24}H_{49})_3$ | | | | | |
| $Al(C_{26}H_{53})_3$ | | | 54.28 | | |

[1] Point x composition was taken as an $Al(C_6H_{13} \text{ avg.})_3$ calculated from the Poisson equation.

TABLE V.—EQUILIBRIUM COMPOSITION OF AlR₃ FEED AND OF DISTILLATION PRODUCTS OBTAINED FROM FEED

| Components, Mole Percent | AlR₃ Feed | | Distillation of AlR₃ Feed | | | |
|---|---|---|---|---|---|---|
| | | | Distillate | | Residue | |
| | Example 2 | Example 3 | Example 2 | Example 3 | Example 2 | Example 3 |
| Al(C₂H₄)₃ | 2.26 | 1.89 | 2.26 | 1.89 | | |
| Al(C₄H₉)₃ | 11.47 | 9.69 | 9.03 | 7.64 | 2.44 | 2.05 |
| Al(C₆H₁₃)₃ | 21.35 | 17.75 | 16.2 | 13.45 | 5.15 | 4.30 |
| Al(C₈H₁₇)₃ | 24.23 | 20.99 | 14.6 | 12.64 | 9.63 | 8.35 |
| Al(C₁₀H₂₁)₃ | 19.36 | 18.97 | 6.93 | 6.79 | 12.43 | 12.18 |
| Al(C₁₂H₂₅)₃ | 11.84 | 13.92 | 2.27 | 2.67 | 9.57 | 11.25 |
| Al(C₁₄H₂₉)₃ | 5.83 | 8.61 | 0.62 | 0.91 | 5.21 | 7.70 |
| Al(C₁₆H₃₃)₃ | 2.41 | 4.62 | 0.12 | 0.23 | 2.29 | 4.39 |
| Al(C₁₈H₃₇)₃ | 0.86 | 2.16 | | | 0.86 | 2.16 |
| Al(C₂₀H₄₁)₃ | 0.27 | 0.91 | | | 0.27 | 0.91 |
| Al(C₂₂H₄₅)₃ | 0.07 | 0.33 | | | 0.07 | 0.33 |
| Al(C₂₄H₄₉)₃ | 0.02 | 0.09 | | | 0.02 | 0.09 |
| Al(C₂₆H₅₃)₃ | | 0.03 | | | | 0.03 |
| Al(C₂₈H₅₇)₃ | | 0.01 | | | | 0.01 |

*Example 4*

The procedure of this example is similar to Examples 2 and 3 with the exception that the AlR₃ used is a $C_{12}$ average R group instead of a $C_8$ average R group. The equilibrium composition that is obtained after three recycles of distillate is set forth in the following tabulation which compares the Poisson distribution of aluminum trialkyls with $C_{12}$ average R groups to that of the equilibrium product after distillation and recycle.

| Olefin Fraction | Initial AlR₃ Product Where R=C₁₂ Avg. Alkyl | Example 4 |
|---|---|---|
| C₂–C₁₀: | | |
| Mole percent | 43.52 | 23.99 |
| Wt. percent | 29.01 | 16.05 |
| C₁₂–C₂₀: | | |
| Mole percent | 52.79 | 71.53 |
| Wt. percent | 63.44 | 76.57 |
| C₂₂+: | | |
| Mole percent | 3.69 | 4.48 |
| Wt. percent | 7.55 | 7.37 |

Example 4 illustrates a definite improvement over the "growth" product having $C_{12}$ average alkyl chain lengths as the $C_{12}$–$C_{20}$ range increased 13.13 weight percent.

What is claimed is:

1. In a process for the preparation of normal alpha olefins which comprises feeding a $C_2$–$C_3$ olefin and a lower molecular weight aluminum trialkyl wherein each of said alkyls contains from 2 to 6 carbons atoms into a growth reaction zone at elevated temperatures and pressures, reacting in said zone said $C_2$–$C_3$ olefin and lower molecular weight aluminum trialkyl, and recovering from said zone an aluminum trialkyl growth product, the improvement which comprises separating said growth product into a lower molecular weight aluminum trialkyl fraction comprising a predominance of $C_2$–$C_8$ aluminum trialkyls and a higher molecular weight aluminum trialkyl fraction comprising a predominance of $C_{10}$, and higher, aluminum trialkyls, subjecting said lower molecular weight aluminum trialkyl fraction to further growth in a growth reaction zone and passing said higher molecular weight aluminum trialkyl fraction to a displacement zone.

2. In a process for the preparation of normal alpha olefins which comprises feeding a $C_2$–$C_3$ olefin and a lower molecular weight aluminum trialkyl wherein each of said alkyls contains from 2 to 6 carbon atoms into a growth reaction zone at elevated temperatures and pressures, reacting in said zone said $C_2$–$C_3$ olefin and lower molecular weight aluminum trialkyl, and recovering from said zone an aluminum trialkyl growth product, the improvement which comprises distilling said growth product at a temperature of from about 100° to about 600° F., under a pressure of $10^{-6}$ to 10 mm. of Hg and for a residence time of from about 0.01 to 10 seconds so as to produce a lower molecular weight distillate comprising a predominance of $C_2$–$C_8$ aluminum trialkyl and a higher molecular weight fraction comprising a predominance of $C_{10}$–$C_{14}$ aluminum trialkyls, subjecting said lower molecular weight distillate to further growth in a growth reaction zone and passing said higher molecular weight fraction to a displacement zone.

3. A continuous cyclic process for the selective production of straight chain $C_{12}$–$C_{20}$ olefins which comprises feeding ethylene and a lower molecular weight trialkyl wherein each of said alkyls contain from 2 to 6 carbon atoms into a growth reaction zone at elevated temperatures and pressures, reacting in said zone said ethylene and lower molecular weight aluminum trialkyl, recovering from said zone an aluminum trialkyl growth product, separating said growth product into a lower molecular weight aluminum trialkyl fraction comprising a predominance of $C_2$–$C_8$ aluminum trialkyls and a higher molecular weight aluminum trialkyl fraction comprising a predominance of $C_{10}$, and higher, aluminum trialkyls, recycling said lower molecular weight aluminum trialkyl fraction to said growth reaction zone and passing said higher molecular weight aluminum trialkyl fraction to a displacement zone.

4. The process of claim 3 in which said lower molecular weight aluminum trialkyl fraction is separated from the higher molecular weight aluminum trialkyl fraction by distillation of the growth alkyl product at a temperature of from about 100° to about 600° F., under a pressure of $10^{-6}$ to 10 mm. of Hg and for a residence time of from about 0.01 to 10 seconds.

5. A continuous cyclic process for the preparation of an olefin product having a predominance of straight chain $C_{12}$–$C_{20}$ olefins which comprises reacting ethylene with a $C_2$–$C_6$ aluminum alkyl in a reaction zone at a temperature of from 160° to 300° F. and a pressure of from 500 to 5000 p.s.i.a. to produce a growth product comprising higher molecular weight aluminum alkyls containing from 4 to 20 and more carbon atoms, recovering said growth product from said reaction zone, distilling from said growth product a lower molecular weight aluminum trialkyl fraction containing predominantly $C_2$–$C_8$ alkyls, said distillation being carried out at a temperature of from about 370° to about 500° F., under a pressure of $10^{-4}$ to 1 mm. of Hg and to a residence time of 0.1 to 2 seconds, recycling said lower molecular weight aluminum trialkyl fraction to said growth reaction zone, and passing at least a portion of the remainder of the growth product to a displacement zone.

References Cited

UNITED STATES PATENTS

| | | | |
|---|---|---|---|
| 2,835,689 | 5/1958 | Ziegler et al. | 260—448 |
| 2,889,385 | 6/1959 | Catterall et al. | 260—683.15 |
| 2,906,794 | 9/1959 | Aldridge et al. | 260—683.15 |

PAUL M. COUGHLAN, Jr., *Primary Examiner.*